(12) United States Patent
Drymalski

(10) Patent No.: US 6,764,089 B2
(45) Date of Patent: Jul. 20, 2004

(54) MANUALLY POWERED DRIVE MECHANISM AND VEHICLE EMPLOYING SAME

(76) Inventor: Robert Drymalski, 44 W. Wrightwood, Apt. 609, Chicago, IL (US) 60614

( * ) Notice: Subject to any disclaimer, the term of this patent is extended or adjusted under 35 U.S.C. 154(b) by 0 days.

(21) Appl. No.: 10/103,366

(22) Filed: Mar. 20, 2002

(65) Prior Publication Data

US 2003/0178807 A1 Sep. 25, 2003

(51) Int. Cl.[7] .............................. B62M 1/04; B62M 1/14
(52) U.S. Cl. ......................... 280/246; 280/255; 280/282
(58) Field of Search ................................ 280/243, 244, 280/246, 251, 250.1, 252, 258, 267, 265, 242.1, 282, 255, 233, 220

(56) References Cited

U.S. PATENT DOCUMENTS

| | | | |
|---|---|---|---|
| 296,936 A | 4/1884 | Davies | |
| 369,860 A | 9/1887 | Kempster | |
| 439,382 A | 10/1890 | Bryden | |
| 631,531 A | 8/1899 | Sargent | |
| 970,109 A | 9/1910 | Plummer | |
| 1,418,266 A | 5/1922 | Thorpe et al. | |
| 4,358,126 A | 11/1982 | Mitchell et al. | |
| 4,524,987 A | * 6/1985 | Kim | 280/204 |
| 4,549,874 A | * 10/1985 | Wen | 280/236 |
| 4,601,482 A | 7/1986 | Ferez | |
| 4,632,414 A | 12/1986 | Ellefson | |
| 4,700,962 A | 10/1987 | Salmon | |
| 4,705,284 A | * 11/1987 | Stout | 280/282 |
| 4,796,907 A | * 1/1989 | Geller | 280/220 |
| 4,811,964 A | * 3/1989 | Horn | 280/250.1 |
| 4,865,344 A | 9/1989 | Romero, Sr. et al. | |
| 4,886,287 A | 12/1989 | Krause, II et al. | |
| 4,925,200 A | 5/1990 | Jones | |
| 4,941,673 A | 7/1990 | Bennett | |
| 4,976,451 A | 12/1990 | Kamenov | |
| 5,135,458 A | 8/1992 | Huang | |

(List continued on next page.)

FOREIGN PATENT DOCUMENTS

| | | | | |
|---|---|---|---|---|
| EP | 318677 | * | 9/1988 | |
| GB | 13330 | * | 6/1896 | 280/265 |
| JP | 6-154269 | * | 6/1994 | |
| WO | 094018059 | * | 8/1994 | 280/244 |

OTHER PUBLICATIONS

Rowbike, Scott Olson, http://www.rowbike.com/models.html, Dec. 27, 2001.

(List continued on next page.)

Primary Examiner—Anne Marie Boehler
(74) Attorney, Agent, or Firm—Bell, Boyd & Lloyd LLC (57) ABSTRACT

The present invention provides a manually powered rowing vehicle. In one embodiment, a chain wraps around a portion of first and second free-wheel wheel sprockets, which can spin freely in one direction but not the other. The first free-wheel drive sprocket drives a rear wheel. The second free-wheel drive sprocket connects to one end of a lever arm, which pivotally connects to a frame. When the rider pulls the other end of the lever arm towards their body, the first free-wheel drive sprocket grabs the chain and pulls the chain forward. The chain in turn pulls the second free-wheel drive sprocket, which rotates the rear wheel forward. When the rider pushes the lever arm away from their body, the first free-wheel drive sprocket spins freely to allow the lever arm to return to the pull position without moving the linked chain or the vehicle.

8 Claims, 11 Drawing Sheets

U.S. PATENT DOCUMENTS

| | | |
|---|---|---|
| 5,209,506 A | 5/1993 | Klopfenstein |
| 5,280,936 A | 1/1994 | Schmidlin |
| 5,284,355 A * | 2/1994 | Ishii .......................... 280/287 |
| 5,330,218 A | 7/1994 | Escudero |
| 5,492,349 A | 2/1996 | Ferez |
| 5,536,029 A | 7/1996 | Gramckow |
| 5,690,346 A | 11/1997 | Keskitalo |
| 5,826,897 A | 10/1998 | Beard |
| 5,865,455 A * | 2/1999 | Taylor ..................... 280/250.1 |
| 5,876,052 A | 3/1999 | Olson et al. |
| 5,901,973 A * | 5/1999 | Warren ....................... 280/260 |
| 6,155,584 A | 12/2000 | Dallet |
| 6,206,394 B1 | 3/2001 | Olson et al. |
| 6,224,078 B1 | 5/2001 | Tidcomb |
| 6,234,504 B1 | 5/2001 | Taylor |
| 6,325,398 B1 * | 12/2001 | Banzi ..................... 280/250.1 |

OTHER PUBLICATIONS

Aviroute—Rowing Machine—Rowing Bike, http://www.aviroute.com/rowbike/rowing–motion/, Dec. 27, 2001.

Fetish, Wired, Jan. 2001.

*Patents*, Sabra Chartrand, The New York Times, Nov. 17, 2003.

* cited by examiner

MANUALLY POWERED DRIVE MECHANISM AND VEHICLE EMPLOYING SAME

BACKGROUND OF THE INVENTION

The present invention relates to manually powered vehicles. More particularly, the present invention relates to a manually powered drive mechanism and a vehicle and method of operating a vehicle employing same.

Unicycles, bicycles and tricycles have been used for years to provide an economic mode of transportation, for fun and entertainment, etc. Bicycles are by far the most common of these devices and generally employ power from a person's lower body, wherein foot pedals typically connect to crank shafts, which in turn rotate a sprocket that drives a chain linking a rear wheel. The drive mechanism of a standard bicycle is relatively simple, which has no doubt helped the bicycle to achieve such enormous popularity.

One primary use of the bicycle is to provide exercise. Bicycles provide an excellent workout for the lower body. Bicycles, however, do not equally use a person's upper body muscles. On a bicycle, the rider typically uses the rider's upper body to steer and to prop-up or support their upper body. Consequently, bicycles do not provide a good total body workout.

One type of machine that does provide a total body workout is a rowing machine. Rowing machines simulate the motion one uses to row a boat. Rowing machines typically consist of a frame that is supported on the floor. Rowing machines provide a seat that rides on a rail between a forward position and a rear position. Rowing machines typically provide handles that easily push forward but provide a resistance to being pulled back. Although rowing machines provide excellent exercise for many muscles including legs, arms, back, shoulders and stomach, they are purely for the benefit of exercise and do not have the ability to move people.

Manually powered vehicles have been developed that combine arm and leg power. These machines attempt to harness the overall total body benefits of a rowing type exercise with a device that can move people. While these machines exist, they have to date not gained widespread commercial popularity. There appear to be a number of reasons to account for the fact that "rowbikes" and the like have not become popular. First, many of the existing rowbikes appear to be awkward and fragile. Second, the mechanisms that drive the rowbikes appear to be complicated. That is, when compared to a bicycle, the rowbike designs contain many more parts, which are awkwardly configured. The numerous and intricately juxtaposed parts create cost and add to the potential for mechanical failure.

Accordingly, there exists a need for a simple, inexpensive, total body workout device that is also capable of transporting a rider.

SUMMARY OF THE INVENTION

The present invention provides a driving mechanism for a manually powered vehicle. More particularly, the present invention provides a manually powered driving mechanism that is suitable for driving vehicles having two, three or four wheels. The driving mechanism includes a frame. At least one rear wheel rotatably connects to the frame via a drive shaft.

A first free-wheel driver, for example, a free-wheel drive sprocket connects to the drive shaft, which holds the rear wheel. A lever arm pivotally attaches to the middle portion of the frame. One end of the lever arm includes a handle that can be grasped and pulled by a rider. The other end of the lever arm rotatably connects to a second free-wheel driver or drive sprocket. The first and second free-wheel drive sprockets spin freely in one direction but not the other.

A linkage or linked chain wraps around a portion of the second free-wheel wheel sprocket and extends towards the rear wheel and wraps around a portion of the first free-wheel drive sprocket. The first free-wheel drive sprocket drives the rear wheel. The chain runs from the first free-wheel drive sprocket, over a roller that pivotally attaches to the frame and back to the second free-wheel drive sprocket, which connects to the end of the lever arm.

When the rider pulls the lever arm towards the rider's body, the second free-wheel drive sprocket grabs the chain and pulls the chain forward over the roller. The chain in turn pulls the first free-wheel drive sprocket, which rotates the rear wheel forward. When the rider pushes the lever arm away from the rider's body, the second free-wheel drive sprocket spins freely to allow the lever arm to return to the pull position without moving the linked chain or the vehicle.

In one embodiment, the roller is positioned on the frame between the first and second free-wheel sprockets. A second roller mounts to the frame closer to the front of the vehicle than the first roller. The linkage or chain extends over the first roller, then downwardly away from the frame and around the bottom of the second free-wheel sprocket (connected to the lever arm), and then back up towards the frame and around the second roller.

From the second roller, the chain extends towards the front of the vehicle and then downwardly from the frame around a tensioner, which is pivotally attached to the frame. A spring or other type of biasing mechanism, such as a piston/cylinder, is biased to rotate the tensioner towards the frame in one rotational direction, while the chain, when pulled by the lever arm and second free-wheel driver, tends to pull the tensioner towards the frame in the opposite rotational direction. The net result is that the tensioner remains extended generally perpendicularly downwardly from the frame and operates to hold the linkage or chain away from the lever arm and the second free-wheel sprocket, to allow same to move back and forth and drive the vehicle without being obstructed by the chain, which runs towards the back of the vehicle to the rear wheel.

The vehicle includes a seat that slidingly engages the frame. The seat slides backward and forward, respectively, as the person or rider pulls the lever arm back towards the rider's body and pushes the lever arm forward towards the front of the vehicle. The lever arm includes a brake lever for manually operating a cable driven brake. The brake includes a brake pad attached adjacent to one of the wheels. In an embodiment, the brake pad frictionally engages a front, steerable wheel.

In one embodiment, at least one front, steerable wheel rotatably attaches to the frame. A steering column extends from the front, steerable wheel, through the frame, and connects to a steering bar that has foot pads attached on each end. Each foot pad holds one of the rider's feet, so that the rider steers the vehicle with the rider's legs. The rider extends his or her right leg to turn the steering bar counterclockwise from the rider's viewpoint to turn the vehicle to the left. The rider extends his or her left leg to turn the steering bar clockwise from the rider's viewpoint to turn the vehicle to the right.

The driving mechanism in one embodiment includes a multitude of different gears. The first or rear free-wheel driver includes a number of different gear settings, for example, a number of different free-wheel sprockets of different size. A standard gear shift rear derailer mounts at the rear of the vehicle and moves the linked chain from one gear to another when the rider engages and moves a gear shift lever and a link between the gear shift lever and the derailer.

The driving mechanism in one preferred embodiment drives one rear wheel. For proper steering of the vehicle it is preferred that the driving mechanism not drive two rear wheels. In any case, the driving mechanism of the present invention is easily adapted to power two, three or four-wheeled vehicles. The four-wheeled embodiment may also be configured as a wheelchair. The driving mechanism does not change, rather, the wheels mount differently and the steering and braking mechanisms are modified.

Accordingly, it is an advantage of the present invention to provide a total body workout driving mechanism and a moveable vehicle embodying same.

It is another advantage of the present invention to provide a rowing vehicle having a simplistic driving mechanism.

It is a further advantage of the present invention to provide a rowing vehicle having a cost effective driving mechanism.

It is still another advantage of the present invention to provide a driving mechanism for a two-wheeled rowing vehicle.

It is still a further advantage of the present invention to provide a driving mechanism for a three-wheeled rowing vehicle.

It is yet another advantage of the present invention to provide a driving mechanism for a four-wheeled rowing vehicle.

Additional features and advantages of the present invention are described in, and will be apparent from, the following Detailed Description of the Invention and the figures.

DETAILED DESCRIPTION OF THE INVENTION

Figure 1:
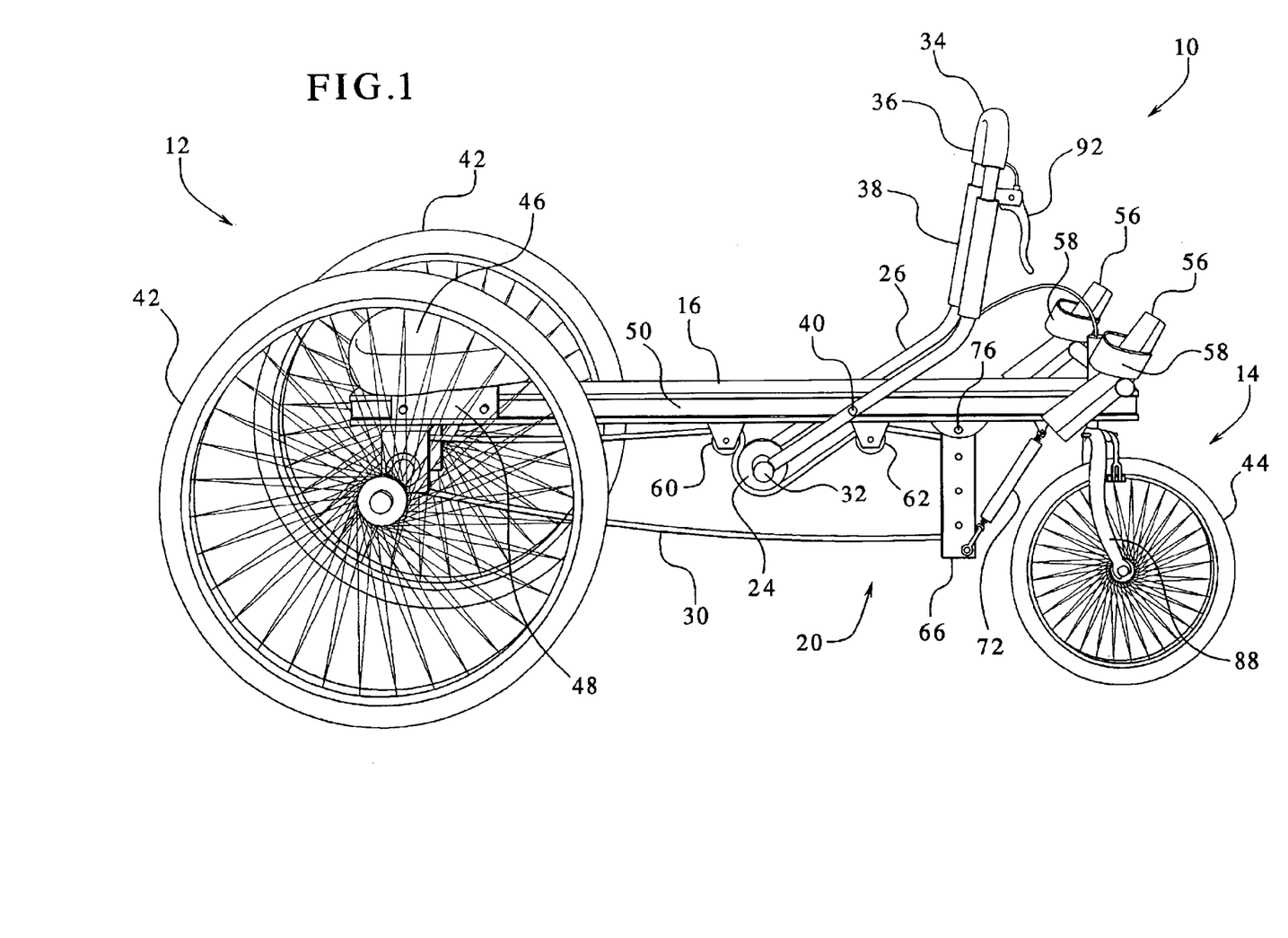
FIG. 1 is a perspective view of a three-wheeled embodiment of the vehicle and drive mechanism of the present invention, wherein the lever arm is substantially in a full forward position, that is, in a position to be pulled backward to thrust the vehicle forward.

Referring now to the drawings and in particular to FIG. 1, one embodiment of a row vehicle 10 is illustrated. The row vehicle 10 includes a rear end 12 and a front end 14. A frame 16 is provided. While frame 16 is illustrated herein as a simple channel or bar, the frame 16 alternatively has supports or struts commonly provided on bicycles, or other desired structural members, etc. The frame 16 includes flanges and/or channels in order to provide additional strength and also to provide areas on which to mount various items. The frame 16 includes various types of coatings which protect the material of the frame 16 and also provide aesthetic value. For example, if the frame 16 is aluminum, it can be anodized or painted. If steel, frame 16 can be primed and/or bead-blasted and painted or otherwise treated, such as with a plating technique. While a metal or metal alloy frame is preferred, it is also possible that frame 16 is made of plastic, wood, or other suitable material or any combination of the above listed materials.

The row vehicle 10 includes a drive mechanism 20, which attaches or is supported in various places by the frame 16. The drive mechanism includes a first free-wheel driver 22 which is hidden from view in FIG. 1, but which may be readily viewed in FIG. 4. The drive mechanism 20 also includes a second free-wheel driver 24, which is illustrated in FIG. 1 as connecting to one end of a lever arm 26.

The first and second free-wheel drivers in one embodiment include free-wheel drive sprockets. The free-wheel drivers or drive sprockets are known in the art and spin freely in one direction about a shaft, such as the drive shaft 28 illustrated in FIG. 4. The free-wheel driver or drive sprockets, however, do not spin in the other direction. One example of a suitable free-wheel driver or free-wheel drive sprocket for the drive mechanism 20 of the present invention is provided by Worksman Trading Corp., Ozone Park, N.Y., Item #4129, 22 teeth freewheel sprocket.

While the first and second free-wheel drivers in one embodiment are drive sprockets, the free-wheel drivers 22 and 24 may have configurations other than a sprocket configuration, as long as the mechanism has the ability to latch into or otherwise mechanically engage a linkage 30. The linkage 30 in an embodiment is a standard link chain. The drive sprockets 22 and 24 engage the linked chain 30 in the same manner as is well known with the standard bicycle. In another embodiment, the drive sprockets are pulleys, and the linkage 30 is a tensioned plastic or rubber belt. In either case, the first and second drivers 22, 24 in one preferred embodiment are rotatable and disk shaped. For purposes of illustration, the remainder of this specification will refer to the free-wheel drivers 22 and 24 as free-wheel drive sprockets and the linkage 30 as a chain 30. However, it should be appreciated that the present invention is expressly not limited to these embodiments.

The lever arm 26 of the drive mechanism 20 rotatably connects at one end to the second free-wheel drive sprocket 24. The free-wheel drive sprocket 24 rotates freely in one direction about a pivot 32 at the end of the lever arm 26. The free-wheel drive sprocket 24 does not, however, rotate in both directions about the pivot 32 of the level arm 26. The other end of the lever arm 26 includes a handle 34. The lever arm 26 in one embodiment is made of a strong metal such as steel, stainless steel or aluminum. The handle 34 in one embodiment includes a material that is comfortable for a rider to grasp, such as plastic, rubber or foam rubber. As illustrated, the handle 34 includes an upper grasping portion 36 and a lower grasping portion 38 which enable the rider to grasp the handle 34 of the lever arm 26 in different places and thereby work out different muscles or different areas of muscles.

The lever arm 26 in the illustrated embodiment is bent back towards the rider. Obviously, the lever arm 26 may have many different configurations, depending on the location of the level arm 26 relative to the rider and the frame. Lever arm 26 pivotally connects to the frame 16 at pivot 40. The pivot 40 in an embodiment includes a bolt or rod that extends through two arms of the lever arm 26, which are disposed on either side of the frame 16. A nut or locknut threads onto the bolt and holds the dual arms of the lever arm 26 to the frame 16.

Figure 2:
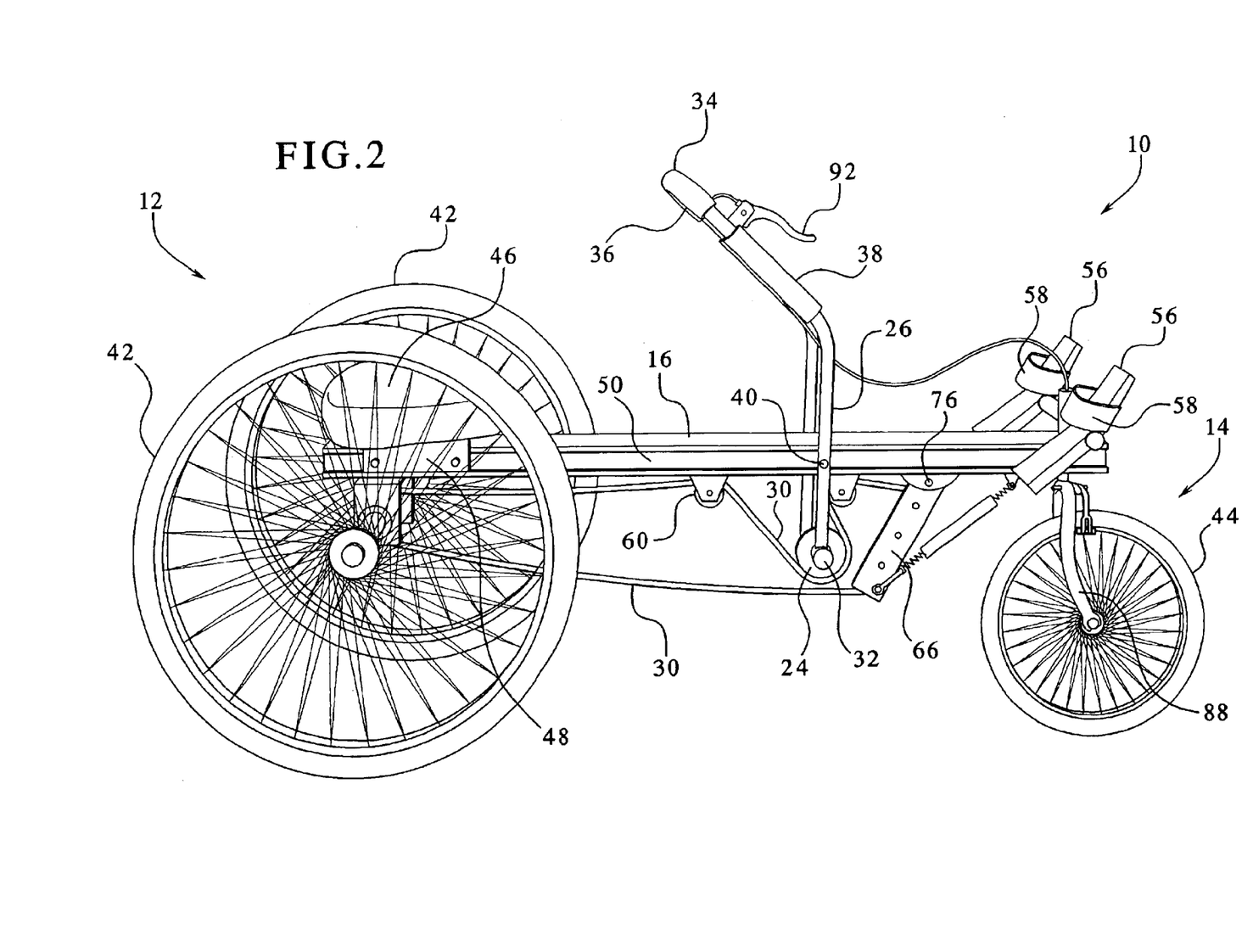
FIG. 2 is a perspective view of the three-wheeled embodiment of the vehicle and drive mechanism of the present invention, wherein the lever arm is substantially in a full rearward position, that is, in a position to be returned towards the front of the vehicle.

FIG. 1 illustrates the lever arm 26 in the full forward position, wherein the rider grasps the upper or lower grasping portion 36, 38 and pulls the lever arm 26 towards the rider's body. FIG. 2 illustrates the lever arm 26 in the full rearward position, wherein the end of the lever arm 26 connecting to the second free-wheel drive sprocket 24 at the pivot 32 points virtually directly downward. The lever arm 26 resides substantially perpendicular to the frame 16. In FIG. 2, the handle 36 of the lever arm 26 has been pulled backward substantially to its furthest possible point.

In operation, viewing the row vehicle 10 from its right side as illustrated in FIGS. 1 and 2, the first and second drive sprockets 22 and 24 rotate freely in the counterclockwise direction but cannot rotate in the clockwise direction. In this manner, viewing vehicle 10 from the right side as in FIGS. 1 and 2, when the rider pulls the handle 34 of the lever arm 26, the lever arm 26 pivots in a counterclockwise manner about pivot 40. Because the free-wheel drive sprocket 24 is constrained not to rotate in the clockwise direction, the drive sprocket 24 therefore imparts a force on the chain 30, which acts to pull the chain 30 downwardly and forwardly towards the front end 14 of the row vehicle 10. The free-wheel drive sprocket 24 pulls the chain 30 illustrated in FIG. 1 forward a distance as illustrated in FIG. 2.

Figure 4:
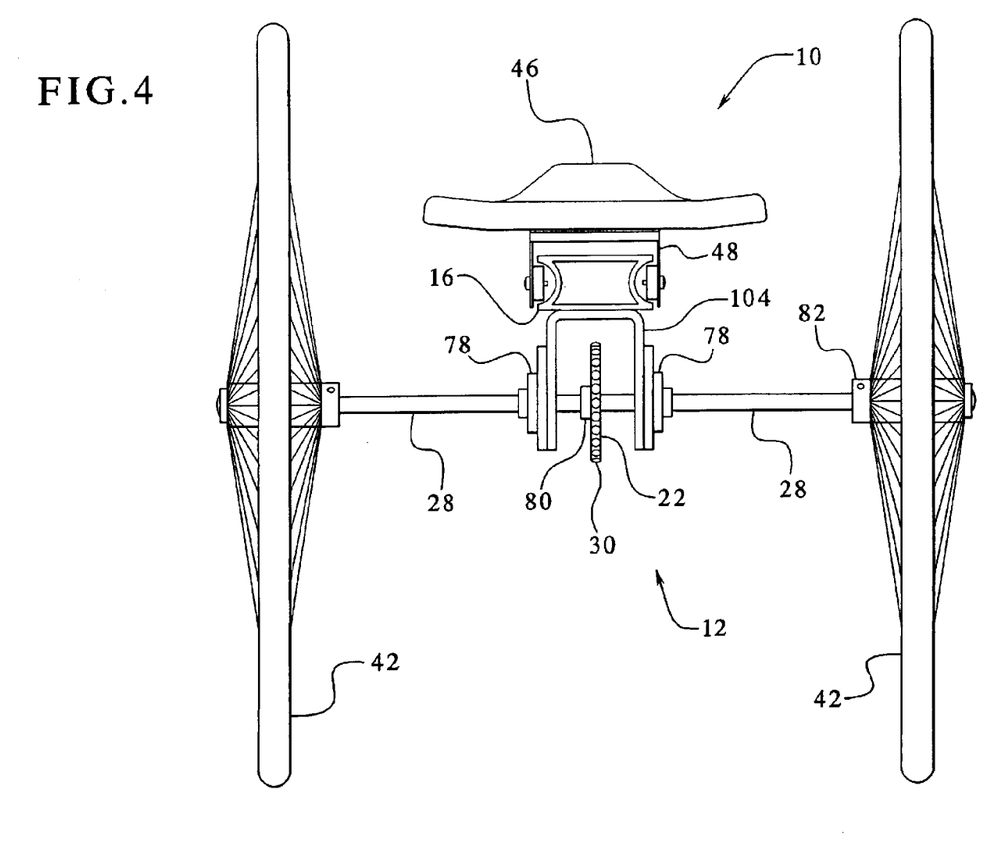
FIG. 4 is an elevation view from the rear end of the vehicle, which more closely shows the drive shaft, rear wheels and rear free-wheel drive sprocket of the drive mechanism of the present invention.

The chain 30 pulls the first free-wheel drive sprocket 22, illustrated in FIG. 4, which is connected to the drive shaft 28 at the rear end 12 of the row bike 10, wherein the chain 30 and sprocket 22 imparts a force on the drive shaft 28, 50 that the drive shaft 28 rotates the rear wheels forward. FIGS. 1, 2, 4, 5 and 6 illustrate a three-wheeled embodiment of the present invention. That is, row vehicle 10 includes two rear wheels 42 and a single steerable front wheel 44. In one preferred embodiment, one of the rear wheels 42 is fixed to the drive shaft 28, while the other rear wheel 42 rotates freely in either direction with respect to the drive shaft 28. This is preferred so that the three wheel design turns properly. Therefore, in operation as seen in FIG. 4, the chain 30 turns the first free-wheel drive sprocket 22, which in turn turns the drive shaft 28 and one of the rear wheels 42. The other rear wheel 42 turns due to the frictional force applied by the road to the free-spinning wheel 42.

The first and second free-wheel drive sprockets 22 and 24, as viewed from the right side of the vehicle 10, are free to rotate in the counterclockwise direction. Thus, in FIG. 2, when the rider pushes the handle 34 of the lever arm 26 forward, the second free-wheel drive sprocket 24 simply turns along the chain 30 and allows the lower end of the lever arm 26 to pivot about pivot 40 up to the position illustrated in FIG. 1. The drive sprocket 24 does not pull or impart a pulling force on the chain 30 when returning from the position in FIG. 2 to the position in FIG. 1. In this manner, the drive mechanism 20 of the row vehicle 10 enables the rider to reload or reposition the handle 34 of the lever arm 26 to once again be able to pull the chain 30 and move the row vehicle 10 forward.

Figure 6A:
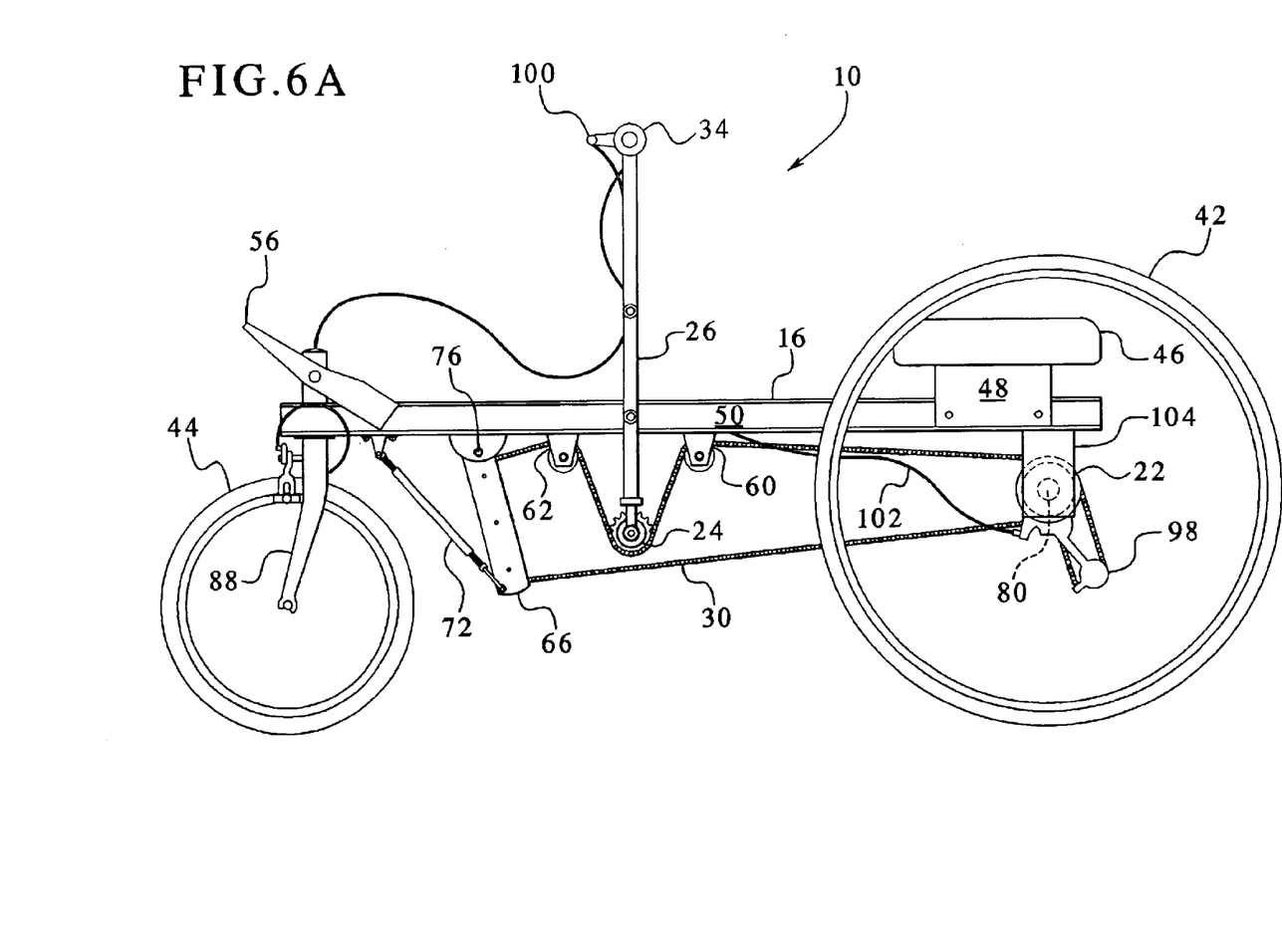
FIG. 6A is an elevation view of the three-wheeled vehicle that illustrates one embodiment for the gear shift mechanism of the present invention.

A seat 46 slideably engages the frame 16. The seat 46 connects to a pair of brackets 48 (see FIGS. 1, 2 and 6), wherein brackets 48 slideably engage a groove 50 defined on both sides of the frame 16. The seat 46 slides back and forth along the frame 16 as the rider pulls the handle 34 of the lever arm 26 rearwardly and pushes the handle 34 forward. The rider slides forward when pushing the handle 34 forward and slides backward toward the rear end 12 when pulling the handle 34.

Figure 5:
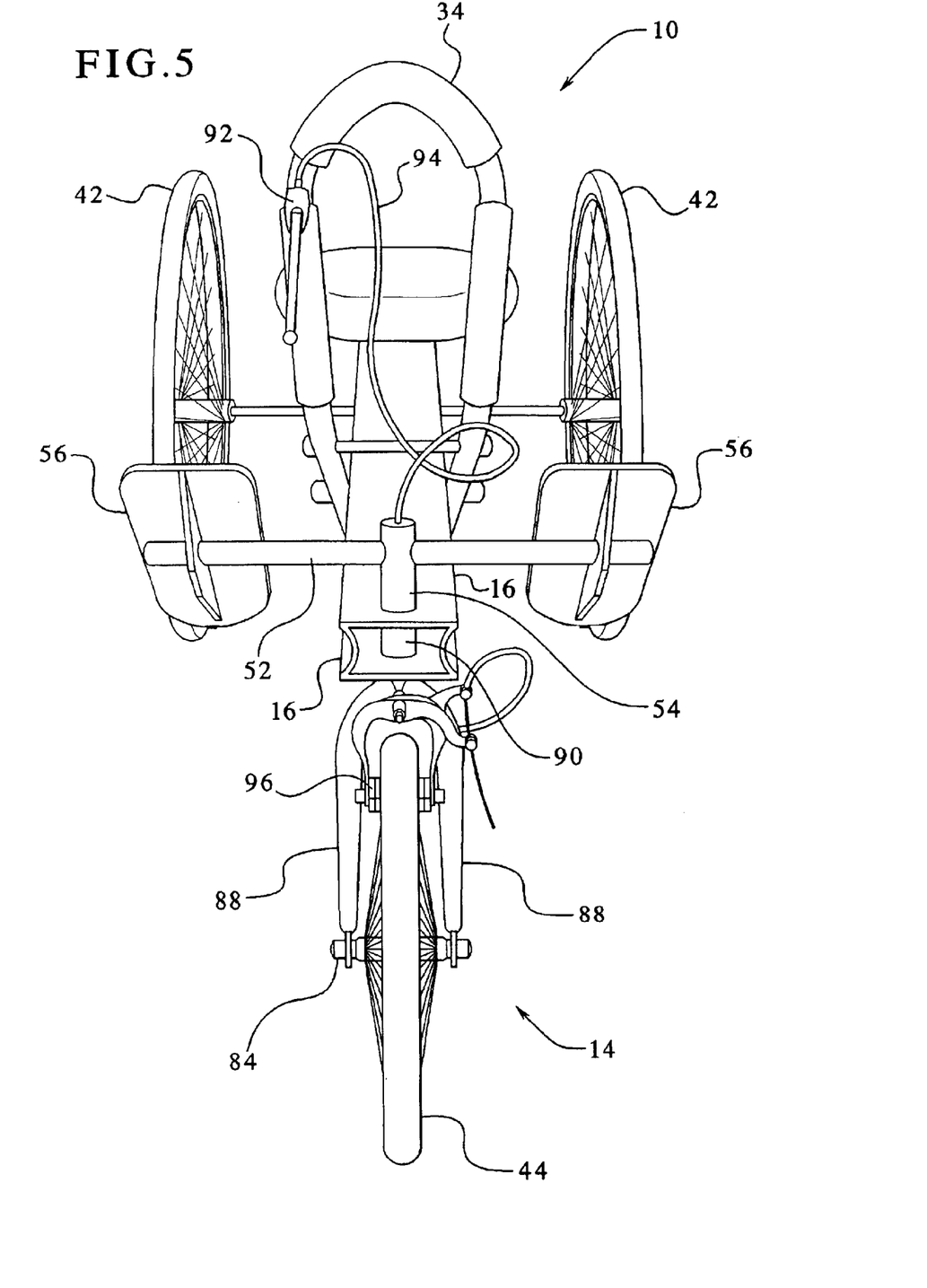
FIG. 5 is a perspective view from the front end of the vehicle, which more closely shows the front, steerable wheel, steering bar, steering column and foot pads of the present invention.

FIG. 5 illustrates that a steering bar 52 pivotally connects to the frame 16 at pivot 54. A pair of foot pads 56 pivotally connect to the steering bar 52 at both ends of same. The foot pads 56 include straps 58 (FIGS. 1 and 2), so that the rider can pull or push against the foot pads 56. Thus, when the rider pulls the handle 34 of lever arm 26 backward to thrust the vehicle 10 forward, the rider pushes against the foot pads 56. In doing so, the rider uses the rider's leg muscles to help pull the chain 30, to turn the rear drive wheel 42, and which also causes the seat 46 to slide backward along the frame 16. Conversely, when the rider pushes the handle 34 of the lever arm 26 towards the front end 14 of the row vehicle 10, the rider is able to pull against the straps 58 of the foot pads 56, which causes the seat 46 to slide forward along the frame 16 and put the rider in position to once again pull the handle 34.

Figure 3:
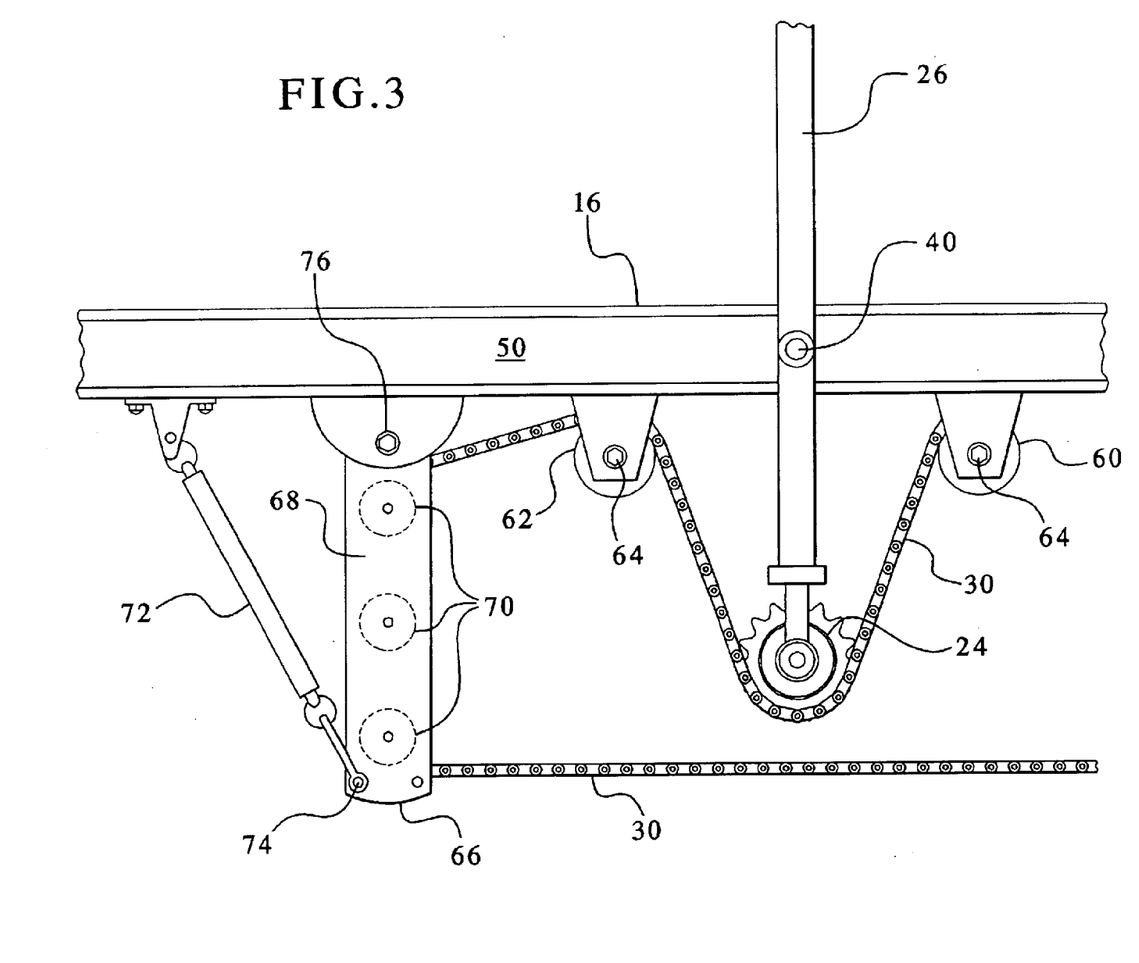
FIG. 3 is a fragmented elevation view, which more closely shows the rollers and front free-wheel drive sprocket of the drive mechanism of the present invention.

Referring now to FIG. 3, a close-up view of the second or front free-wheel drive sprocket 24 is illustrated. A first roller 60 and a second roller 62 attach to the frame 16. The first and second rollers 60 and 62 pivot about pivot points 64, which enable the chain 30 to roll over the rollers 60 and 62 in a substantially frictionless manner. In an embodiment, the first and second rollers 60 and 62 mount to the frame 16 on either side of the pivot 40 of the lever arm 26. It should be appreciated, however, that the pivot 40 could be positioned in alternative relationships to the first roller 60 and the second roller 62 such as being substantially closer to the first roller 60 or being placed on the forward side of the second roller 62.

The rollers 60 and 62 maintain one side of the loop of the chain 30 at or near the underside of the frame 16 and act to wrap the chain 30 around the drive sprocket 24. The first roller 60 also provides a fixed position against which the second free-wheel drive sprocket pulls the chain 30. That is, the roller 60 enables the chain 30 which runs substantially horizontally along with the frame 16 to turn at some varying angle over the roller 60. FIGS. 2 and 3 illustrate that when the lever arm 26 is in a pulled-back position towards the rear end 12, the roller 60 enables the chain 30 to make an approximately 450 angle with the frame 16. The roller 60 thereby acts to wrap the chain 30 around the free-wheel drive sprocket 24, so that the chain engages more teeth of same than would the chain 30 if the roller 60 did not exist. One suitable roller for the rollers 60 and 62 is an MRP Grooved Roller provided by Mountain Speed, Inc., Portland, Oreg.

FIG. 3 illustrates that the second roller 62 also wraps the chain 30 around the drive sprocket 24. The chain 30 then extends forward past the second roller 62, towards the front end 14 of the row vehicle 10, wherein the chain engages a tensioner 66. The tensioner 66 includes side plates 68 which hold a series of rollers 70. The chain 30 turns downwardly away from the frame 16 along the top roller 70, is guided by the middle roller 70 down towards the bottom roller 70, wherein the chain 30 turns to face the rear end 12 and returns substantially along the length of the frame 16 to the first free-wheel drive sprocket 22. In this manner, chain 30 creates a loop.

As seen in FIG. 3, a biasing mechanism 72 pivotally attaches to the frame 16 and to the tensioner 66 at pivot point 74. In one embodiment, the biasing mechanism 72 includes a tensioning spring selected to have a desired spring rate or spring constant. In an alternative embodiment, the biasing mechanism 72 includes a piston/cylinder device. Both types of biasing mechanisms are well known to those of skill in the art. Further, it is common to pivotally attach such biasing mechanisms between hinged members. In the illustrated embodiment of FIGS. 1 to 3, the biasing mechanism 72 includes a tension spring and a plastic or otherwise protective covering over the majority of the spring.

As illustrated in FIG. 1, when the handle 34 of the lever arm 26 is in the forwardmost pulling position, the tensioner 66 extends substantially perpendicular from the frame 16 and the tensioning spring 72 is in a relatively relaxed position. In FIG. 2, when the handle 34 of the lever arm 26 has been pulled to a substantially rearmost position, the force of the chain 30 rotates the tensioner 66 about pivot point 76 linking the tensioner 66 to the frame 16. The rotation of the tensioner 66 pulls the spring 72 and also rotates the spring 72 slightly about the pivot point 74 relative to the tensioner 66.

When the rider pushes the handle 34 of the lever arm 26 forward towards the position shown in FIG. 1, the biasing mechanism 72 automatically pulls the tensioner 66 so that the tensioner 66 rotates about pivot point 76 back to its substantially perpendicular position, which maximizes the vertical distance that the bottom of chain 30 can extend beneath the frame 16. In essence, the tensioner 66 ensures that the chain 30 clears the second free-wheel drive sprocket 24 when the sprocket 24 pivots towards its lowest position, as shown in FIGS. 2 and 3.

Referring now to FIG. 4, a pair of bearings 78 hold the drive shaft 28 in a rotational relationship with respect to the frame 16. The bearings 78 are attached to the frame 16 by any suitable means. The first free-wheel drive sprocket 22 attaches to the drive shaft 28 via a hub 80. The shaft 28 defines a keyway (not illustrated) which frictionally accepts a portion of the key. The hub 80 also defines a keyway (not illustrated) which accepts another portion of the key (not illustrated). The key and keyway provide a well-known means for attaching the hub 80 to the drive shaft 28. The drive sprocket 22 rotates freely in one rotational direction with respect to the hub 80 and the drive shaft 28 but is not able to rotate in both directions with respect to same. FIG. 4 illustrates that the right rear wheel 42 includes a bearing 82, which enables the right rear wheel 42 to rotate freely in both directions with respect to the drive shaft 28. The left rear wheel 42 fixedly attaches to the drive shaft 28, so that the wheel 42 turns as the drive shaft 28 turns.

Referring now to FIG. 5, a view of the three-wheeled vehicle 10 from the front end 14 is illustrated. FIG. 5 illustrates that an axle 84 of the single front-wheel 44 attaches on both ends to a set of forks 88. The forks 88 come together and fix to a steering column 90 which extends through the frame 16. The steering column 90 pivots horizontally with respect to the frame 16 via pivot 54. The steering column 90 mechanically links to the steering bar 52.

The rider steers the vehicle 10 by applying pressure to one of the footpads 56, which in turn rotates the steering bar 52 about the pivot 54. The rider uses the rider's right leg to rotate the steering bar 52 in a counter-clockwise manner with respect to the rider, so that the front wheel 44 turns left. Conversely, the rider uses the rider's left leg to press the left footpad 56, so that the steering bar 52 rotates clockwise with respect to the rider, wherein the front wheel 44 thereby turns to the right. The foot controlled steering of the vehicle 10 enables the rider to pull or push the handle 34 of the lever arm 26 independent of the steering function performed by the steering bar 52 and front steerable wheel 44.

FIGS. 1, 2 and 5 illustrate that a brake lever 92 mounts to the handle portion 34 of the lever arm 26. The brake lever 92 enables the rider to place tension on a brake cable 94 to thereby close a pair of brake pads 96 which frictionally engage the front steerable wheel 44. This action causes the braking of the vehicle 10 as is well known in the art. The brake pads 96 in an alternative embodiment mount adjacent to one of the rear wheels 42. The illustrated embodiment in FIGS. 1, 2 and 5 show a single brake lever 92 and a single pair of brake pads. It should be appreciated, however, that a second brake lever could additionally be attached to the handle portion 34 of the lever 26, which would enable the rider to tension a second brake cable that would run to a second pair of brake pads positioned and arranged to frictionally engage one of the rear wheels 42.

Figure 6B:
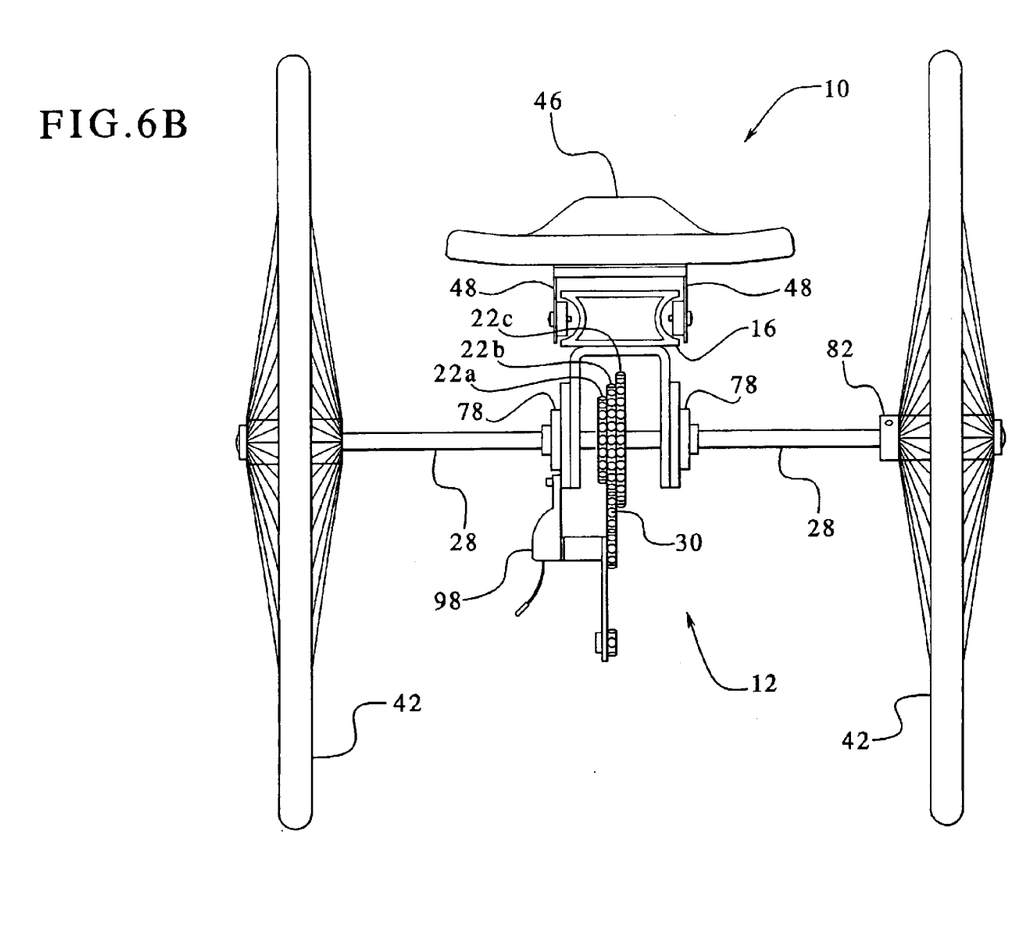
FIG. 6B is an elevation view from the rear end of the three-wheeled vehicle that illustrates the embodiment for the gear shift mechanism discussed in connection with FIG. 6A.

Referring now to FIGS. 6A and 6B, the three-wheeled vehicle 10 is illustrated having a gear shift derailer 98. In one embodiment, the hub 80 of the first free-wheel drive sprocket 22 connects to a multitude of different sized sprockets. The different sizes of sprockets provide a different gear ratio between the second free-wheeled drive sprocket 24, which mounts to the lever arm 26, and the first free-wheel drive sprocket 22. Generally, the smaller the sprocket driving the rear wheel 42, the harder the sprocket will be to turn but the more revolutions or fraction of a revolution the wheel 42 will make per stroke of the lever arm 26. By providing a multitude of different sized sprockets, the vehicle 20 can start out with the chain 30 being tensioned about a larger sprocket, so that the vehicle 10 is easier to move initially. Once the vehicle 10 has obtained a certain speed and a certain amount of momentum, the gear shift derailer 98 enables the rider to switch the gear ratio, so that the same stroke of the lever arm 26 produces more turn of the wheel 42.

The derailer 98 includes any derailer for bicycles known to those of skill in the art. In an embodiment, the derailer 98 mounts to a plate supporting one of the bearings 78. The derailer 98 alternatively mounts to a channel 104 that bolts to the underside of the frame 16 and extends downwardly to mount the bearings 78. The derailer further alternatively can mount directly to the underside or the back of the frame 16, so that the seat 46 is still enabled to slide freely back and forth.

The operator controls the shifting of gears via a gear shift lever 100, which attaches to the handle portion 34 of the lever arm 26. In a similar manner as described above with the operation of the brake, the gear shift lever 100 controls the tensioning of a gear cable or link 102, so that the lever 100 pulls the gear cable or link 102 to cause the derailer 98 to change position and pull the chain 30 from one sized sprocket to another. The gear shift lever 100, unlike the brake cable lever 92, is bi-directional so that the rider can switch gears in both directions, i.e., switch to a lower more easily turning gear or switch to a higher speed gear. FIG. 6B illustrates one embodiment having three gears that are established by three different rear drive sprockets 22a to 22c.

Figure 7:
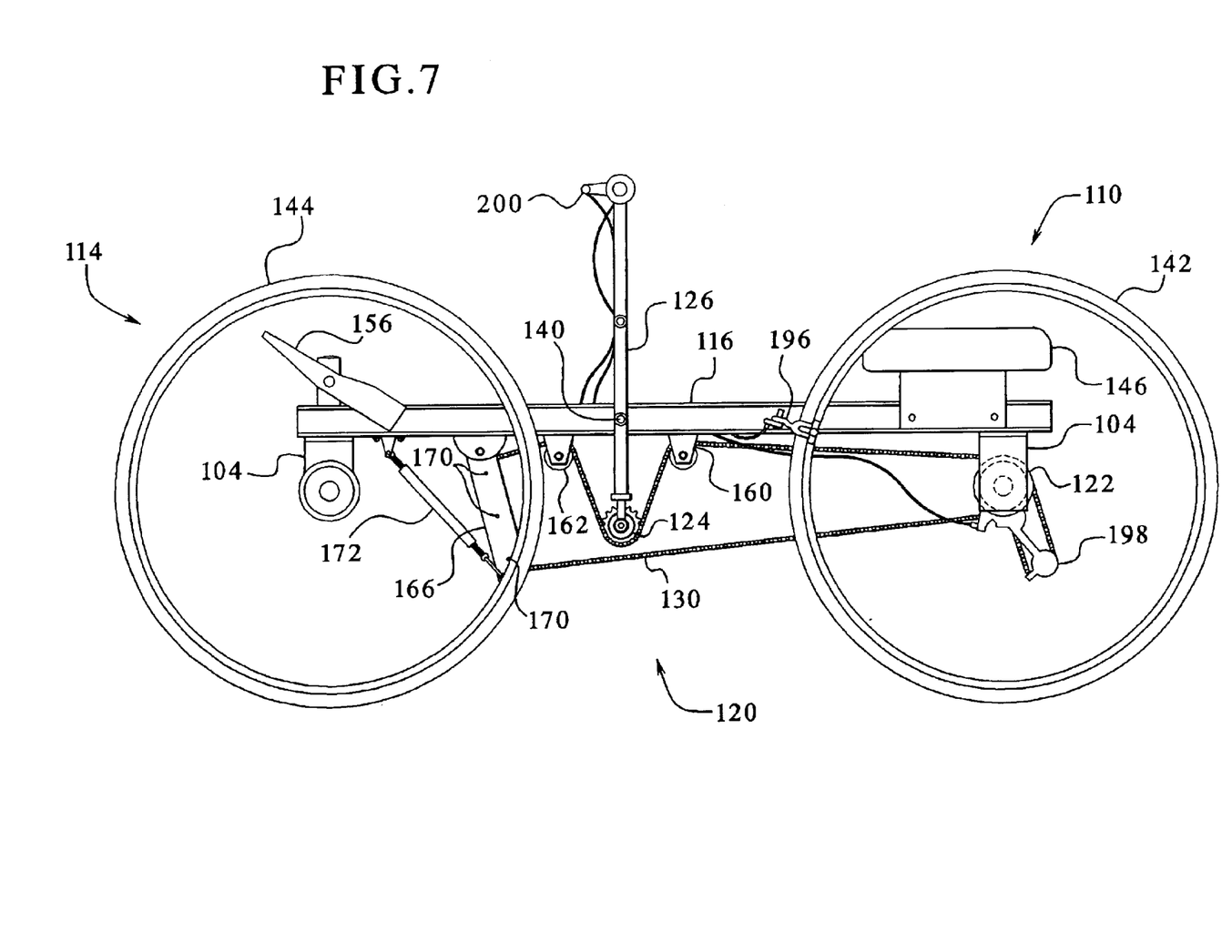
FIG. 7 is an elevation view of a four-wheeled vehicle of the present invention including a gear shift mechanism.
Figure 8:
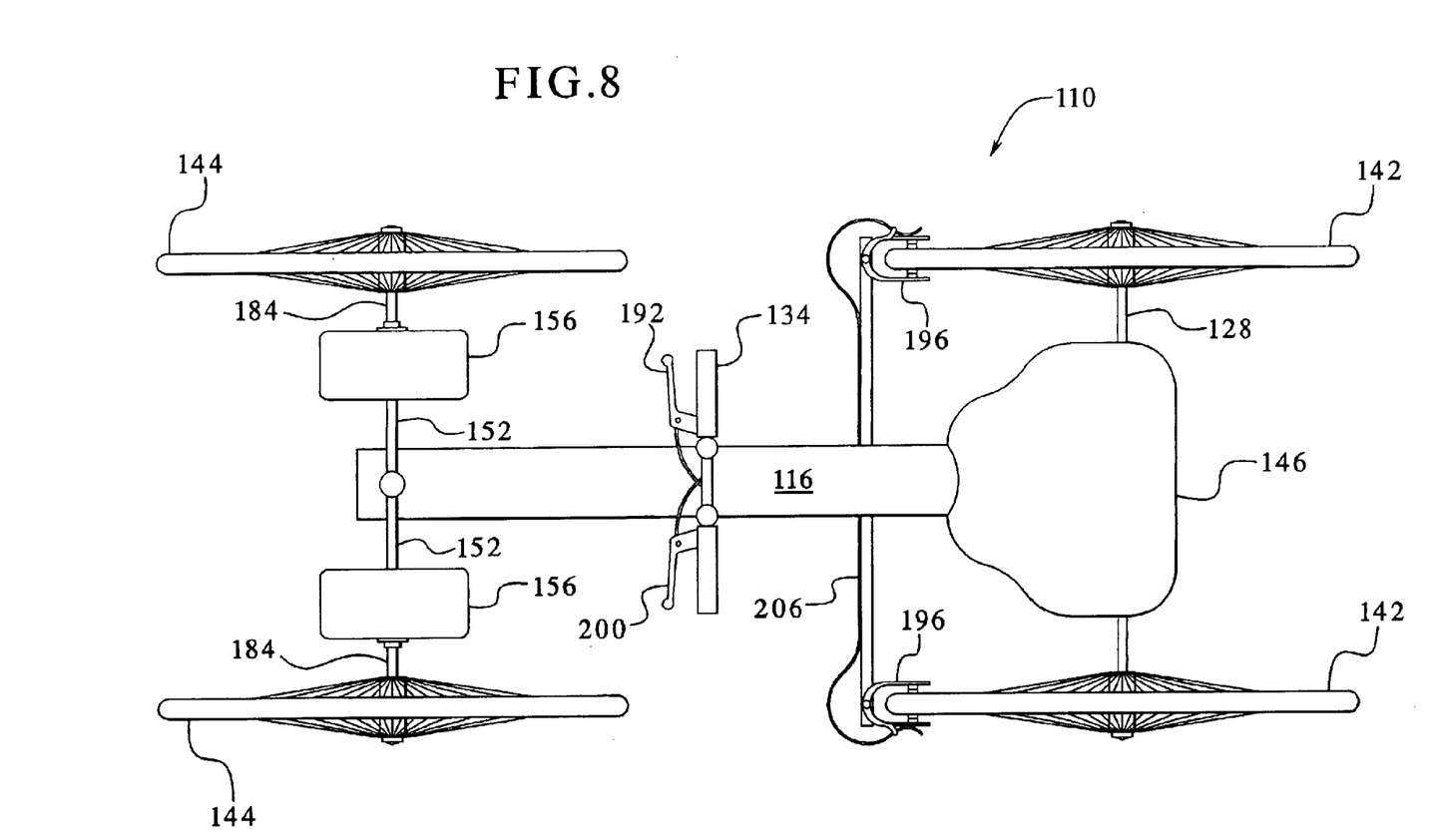
FIG. 8 is a top plan view of the four-wheeled vehicle of FIG. 7.

Referring now to FIGS. 7 and 8, a four-wheeled vehicle 110 employing a drive mechanism 120 of the present invention is illustrated. The four-wheeled vehicle 110 includes each of the major functioning components described above for the three-wheeled vehicle 10. The drive mechanism 120 operates exactly the same as the drive mechanism 20 of the three-wheeled vehicle 10. In particular, the drive mechanism 120 drives one rear wheel 142 as described above. The drive mechanism 120 includes a first free-wheeled drive sprocket 122 and a second free-wheeled sprocket 124, which operate the same as the first and second drive wheels 22 and 24 of the vehicle 10. The second free-wheeled drive sprocket connects to one end of a lever arm 126, which pivots about a pivot 140 connecting the lever arm 126 to the frame 116.

First and second rollers 160 and 162 enable the chain 130 to change angle and thereby engage more teeth of the drive sprocket 124. A tensioner 166 directs the chain 130 to extend beneath the drive sprocket 124 at all times and feeds the chain 130 back up along a set of rollers 170 towards the underside of the frame 116, wherein the chain is enabled to create a loop. A biasing mechanism 172 pivotally attaches to the frame 116 and the tensioner 166 so that the tensioner 166 automatically pivots towards a perpendicular position with respect to the frame 116 when the rider pushes the lever arm 126 towards a front end 114 of the four-wheeled vehicle 110.

The rider operates the four-wheeled vehicle 110 by sitting on a slideable seat 146 and by pushing and pulling against a set of foot pads 156. The four-wheeled vehicle 110 also includes the braking mechanism and a gear shift derailer 198 as described above.

The primary difference between the four-wheeled vehicle 110 and the three-wheeled vehicle 10 is that the channel or mount 104, which only mounts to the rear end of the frame 16 to hold the rear wheels 42 of the vehicle 10 as best seen in FIG. 6A, additionally mounts to the front end of the frame 116 to hold the dual front wheels 144 of the four-wheeled embodiment of the vehicle 110. Also, as illustrated in FIG. 7, the four-wheeled vehicle 110 does not include a set of forks to hold front wheels 144 as in the three-wheeled vehicle 10.

Without the forks, the four-wheeled vehicle 110 requires a member to extend outwardly from the frame 116 and attach to brake pads 196, which in the illustrated embodiment stop one or both of the rear-wheels 142. That is, because there is no centrally located wheel in the four-wheeled embodiment, the brake pads 196 must offset laterally from the frame 116. FIG. 8 illustrates that a member 206 extends from the frame 116. The member 206 supports two pairs of brake pads 196. The handle portion 134 of the lever arm 126 as illustrated in FIG. 8 includes a brake lever 192 that operates the left and right brake pads 196 and a gear shift lever that operates the derailer 198.

Steering the four-wheeled vehicle 110 occurs in substantially the same manner as described above for the three-wheeled vehicle 10. The front wheels 144 attach to an axle 184, which spaces apart the front wheels 144 in the same manner that the drive shaft 128 spaces apart the rear wheels 142. The axle 184 connects to a steering column, not illustrated, which extends vertically upward through the extra support channel 104 and through the frame 116. The steering column mechanically connects to a steering bar 152, which supports the pivotally attached foot pads 156 at both ends.

When the rider presses the right foot pad 156, the steering bar 152 rotates in a counter-clockwise direction with respect to the rider and causes the steering column to likewise rotate in a counter-clockwise manner, which causes the axle 184 and the front wheels 144 to turn to the left. Conversely, when the rider presses the left foot pad 156, the steering bar 152 and steering column rotate clockwise with respect to the rider, wherein the axle 184 and front wheels 144 turn to the right accordingly. It should be appreciated that the four-wheeled vehicle 110 is readily adapted to a wheelchair by removing the foot steering mechanisms and by repositioning the orientation of the person or rider to an upright sitting position.

Figure 9:
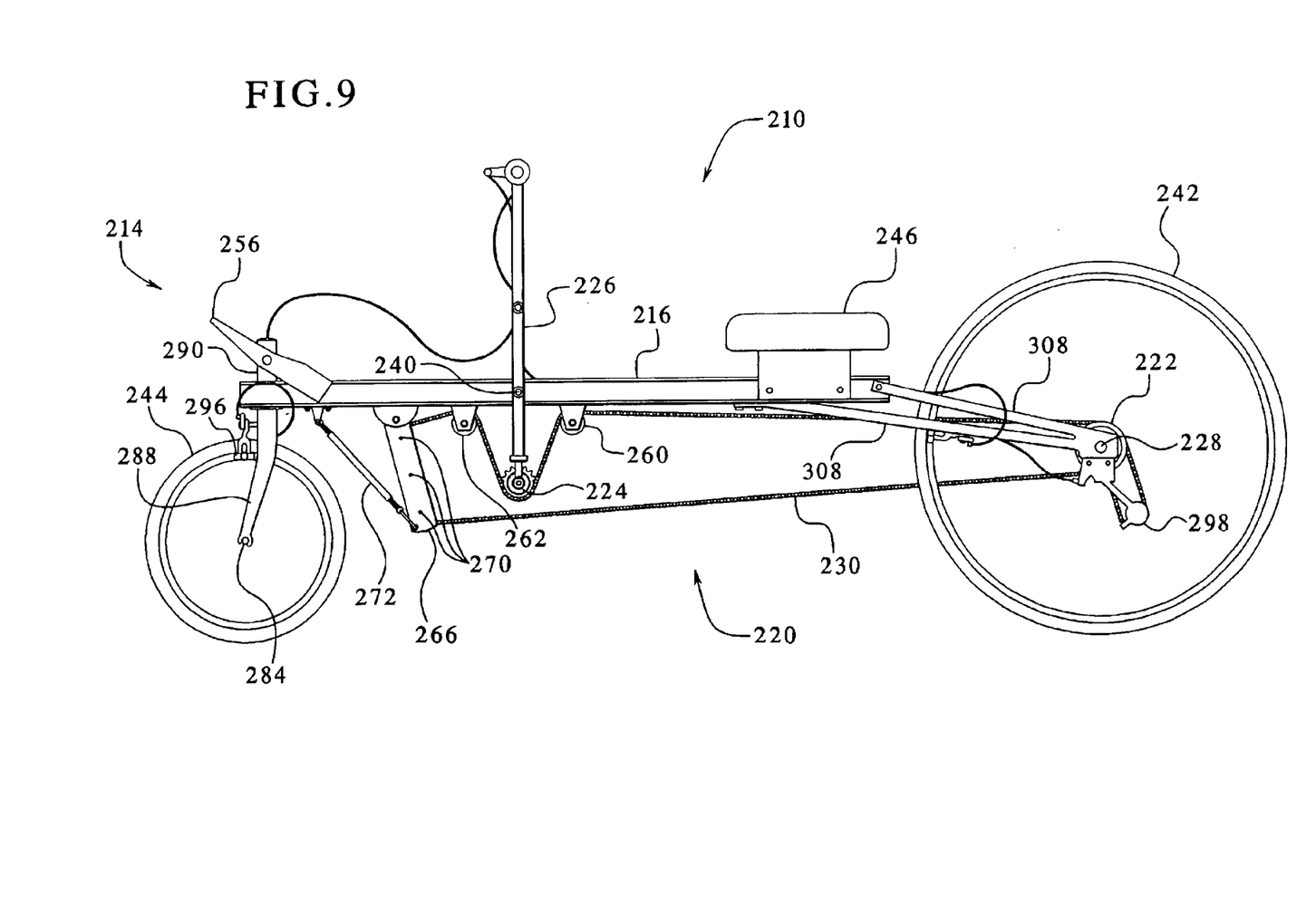
FIG. 9 is an elevation view of a two-wheeled vehicle of the present invention including a gear shift mechanism.
Figure 10:
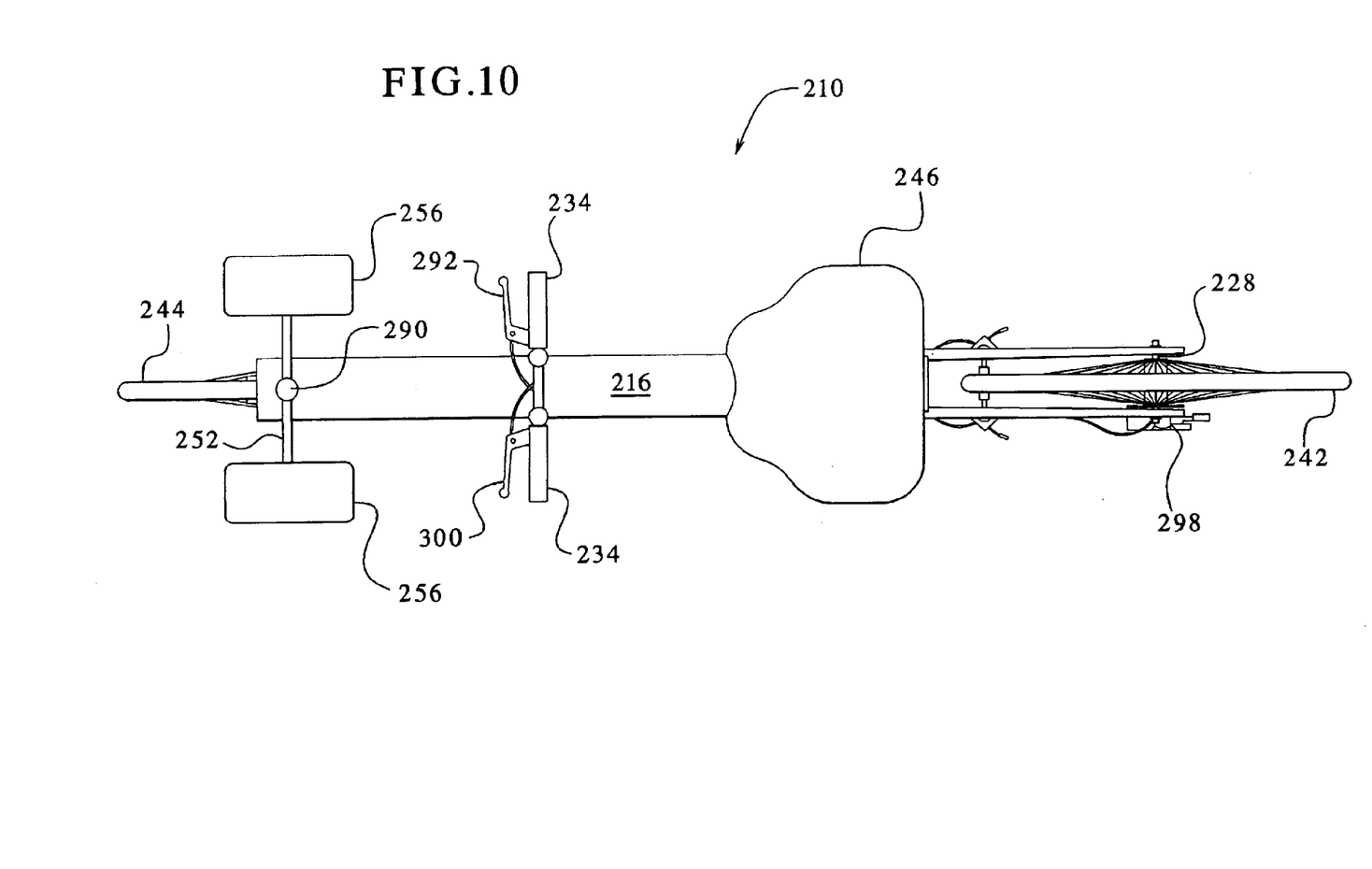
FIG. 10 is a top plan view of the two-wheeled vehicle of FIG. 9.

Referring now to FIGS. 9 and 10, a two-wheeled vehicle 210 employing a drive mechanism 220 of the present invention is illustrated. The two-wheeled vehicle 210 includes each of the major functioning components described above for the three-wheeled vehicle 10. The drive mechanism 220 operates exactly the same as the drive mechanism 20 of the three-wheeled vehicle 10. In particular, the drive mechanism 220 drives the single rear wheel 242 as described above. The drive mechanism 220 includes a first free-wheeled drive sprocket 222 and a second free-wheeled sprocket 224, which operate the same as the first and second drive sprockets 22 and 24 of the vehicle 10. The second free-wheeled drive sprocket connects to one end of a lever arm 226, which pivots about a pivot 240 connecting the lever arm 226 to the frame 216.

First and second rollers 260 and 262 enable the chain 230 to change angle and thereby engage more teeth of the drive sprocket 224. A tensioner 266 directs the chain 230 to extend beneath the drive sprocket 224 at all times and feeds the chain 230 back up along a set of rollers 270 towards the underside of the frame 216, wherein the chain is enabled to create a loop. A biasing mechanism 272 pivotally attaches to the frame 216 and the tensioner 266 so that the tensioner 266 automatically pivots towards a perpendicular position with respect to the frame 216 when the rider pushes the lever arm 226 towards a front end 214 of the two-wheeled vehicle 210.

The rider operates the two-wheeled vehicle 210 by sitting on a slideable seat 246 and by pushing and pulling against a set of foot pads 256. In an alternative embodiment, the foot pads 256 are positioned lower and more towards the center of the vehicle 210 than shown in FIG. 9, so as to provide more stability than the illustrated embodiment of the vehicle 210. The two-wheeled vehicle 210 also includes the braking mechanism and a gear shift derailer 298 as described above.

The primary difference between the two-wheeled vehicle 210 and the three-wheeled vehicle 10 is that the channel or mount 104, which mounts to the rear end of the frame 16 to hold the rear wheels 42 of the vehicle 10 as best seen in FIG. 6A, is not provided on the two-wheeled vehicle 210. The rear wheel 242 mounts to the frame 216 via a multitude of struts 308, which securely and rotatably fasten to a drive shaft 228, which drives the rear wheel 242.

The two-wheeled vehicle 210 includes a set of forks 288 that hold the front wheel 244 as is present in the three-wheeled vehicle 10. The handle portion 234 of the lever arm 226 as illustrated in FIG. 10 includes a brake lever 292 which operates the brake pads 296 positioned around the front wheel 244. The handle portion 234 also includes a gear shift lever 300 that operates the derailer 298.

Steering the two-wheeled vehicle 210 occurs in substantially the same manner as described above for the three-wheeled vehicle 10. The front wheel 244 attaches to an axle 284, which can be a standard bicycle axle. The forks 288 come together and fix to a steering column 290, which extends through the frame 216 in a similar manner as with the vehicle 10. The steering column 290 pivots horizontally with respect to the frame 216 via a pivot point. The steering column 290 connects to a steering bar 252.

The steering bar 252 supports pivotally attached foot pads 256 at both ends. When the rider presses the right foot pad 256, the steering bar 252 rotates in a counter-clockwise direction with respect to the rider and causes the steering column to likewise rotate in a counter-clockwise manner, which causes the axle 284 and the front wheel 244 to turn to the left. Conversely, when the rider presses the left foot pad 256, the steering bar 252 and steering column rotate clockwise with respect to the rider, wherein and the axle 284 and front wheel 244 turn to the right accordingly.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A mechanism for manually powering a vehicle comprising:
    a frame;
    a first free-wheel driver rotatably attached to the frame;
    a lever arm pivotally attached at a pivot point to the frame, the lever arm including a first end that is grasped and moved by a person and a second end that rotatably attaches to a second free-wheel driver, the pivot point located between the first and second ends; and
    a linkage that is moved by the second free-wheel driver when the person pivots the first end of the lever arm, wherein the linkage rotates the first free-wheel driver, wherein the first free-wheel driver drives a wheel, and wherein the driven wheel is connected rotatably to a second wheel so that the second wheel rotates freely with respect to the driven wheel and the first free-wheel driver.

2. The mechanism of claim 1, wherein the second free-wheel driver pulls the linkage, which causes the first free-wheel driver to rotate.

3. The mechanism of claim 1, which includes a roller attached to the frame, wherein the second free-wheel driver pulls the linkage over the roller, which causes the first free-wheel driver to rotate.

4. The mechanism of claim 3, wherein the roller is a first roller and which includes a second roller attached to the frame, the second roller holding the linkage towards the frame.

5. The mechanism of claim 1, wherein the driven wheel and the second wheel are connected rotatably via a drive shaft.

6. The mechanism of claim 1, wherein the linkage includes a chain and the first and second free-wheel drivers include sprockets.

7. The mechanism of claim 1, wherein the first free-wheel driver includes a plurality of different gear settings, and which includes a means for changing the linkage to one of the different gear settings.

8. The mechanism of claim 1, wherein the gear changing means fixes to the frame.

* * * * *